US007397766B2

(12) United States Patent
Kodialam et al.

(10) Patent No.: US 7,397,766 B2
(45) Date of Patent: Jul. 8, 2008

(54) HIGH-SPEED TRAFFIC MEASUREMENT AND ANALYSIS METHODOLOGIES AND PROTOCOLS

(75) Inventors: Muralidharan Sampath Kodialam, Marlboro, NJ (US); Tirunell V. Lakshman, Morganville, NJ (US); Wing Cheong Lau, Middletown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 641 days.

(21) Appl. No.: 10/909,908

(22) Filed: Aug. 2, 2004

(65) Prior Publication Data

US 2005/0220023 A1 Oct. 6, 2005

Related U.S. Application Data

(60) Provisional application No. 60/558,230, filed on Mar. 31, 2004.

(51) Int. Cl.
*G01R 31/08* (2006.01)

(52) U.S. Cl. .................................................... 370/252

(58) Field of Classification Search .................. 370/252
See application file for complete search history.

(56) References Cited

U.S. PATENT DOCUMENTS

| | | | | |
|---|---|---|---|---|
| 5,999,961 | A * | 12/1999 | Manohar et al. | 708/505 |
| 7,146,416 | B1 * | 12/2006 | Yoo et al. | 709/224 |
| 2002/0143929 | A1 * | 10/2002 | Maltz et al. | 709/224 |

FOREIGN PATENT DOCUMENTS

WO WO 03/075509 A 9/2003

OTHER PUBLICATIONS

Lam, IEEE Transactions on Computers, vol. 40, No. 3, Mar. 1991.*

Sarnath, IEEE Efficient parallel algorithms for selection and searchingon sorted matrices, 1992.*

A. Medina et al., "Traffic Matrix Estimation: Existing Techniques And New Directions", *Proc. of ACM SIGCOMM'02*, Aug. 19-23, 2002, Pittsburg, Pennsylvania.

Y. Zhang et al., "Fast Accurate Computation of Large-Scale IP Traffic Matrices From Link Loads", *Proc. of ACM SIGMETRICS'03*, Jun. 10-14, San Diego, CA.

(Continued)

*Primary Examiner*—Chau Nguyen
*Assistant Examiner*—Eunsook Choi

(57) ABSTRACT

A network-wide traffic measurement/analysis problem is formulated as a series of set-cardinality-determination (SCD) problems, using probabilistic distinct sample counting techniques to compute network-wide traffic measurements of interest in a distributed manner via the exchange of light-weight traffic digests (TD's) amongst network nodes/routers. A TD for N packets uses only requires O(loglog N) bits of memory storage, making it possible to distribute nodal TD's to all routers within a domain by piggybacking them as opaque data objects inside existing control messages, such as OSPF link-state packets (LSPs) or I-BGP control messages. A router receiving the TD's can estimate the traffic measurements of interest for each of its local links by solving a series of set-cardinality-determination problems. The traffic measurements of interest are typically per-link, per-traffic-aggregate packet (or flow) counts, where an aggregate is defined by the group of packets sharing the same originating and/or destination nodes (or links) and/or some intermediate nodes (or links).

18 Claims, 2 Drawing Sheets

EXTRACTION OF TRAFFIC DIGEST FROM A PACKET SET

PACKETS BELONG TO PACKET SET $S_p$ (10) → EXTRACT PACKET IDENTIFIER (PID) FROM INVARIANT PARTS OF EACH PACKET (20) → INPUT PID OF EACH PACKET TO THE HASH FUNCTION TO GET AN $R_{max}$-BIT OUTPUT h(PID) (30) → m-WAY SPLIT BASED ON THE LAST $\log_2 m$ BITS OF h(PID) (40) → BUCKET 1 ... BUCKET m (50)

FOR BUCKET i: TRACK Ri, THE MAXIUM NUMBER OF CONSECUTIVE LEADING ZEROS IN THE FIRST $(R_{max}-\log_2 m)$ BITS OF ALL HASH OUTPUTS h(PID)'S ASSIGNED TO THE j-th BUCKET BY USING FUNCTION r()

$R_1$ ... $R_i$ ... $R_m$

AT THE END OF THE MEASUREMENT PERIOD, THE COLLECTION OF $R_1$ TO $R_m$ BECOMES THE LIGHT-WEIGHT TD OF THIS PACKET SET $S_{pi}$ SIZE OF TD = $m\log_2 R_{max}$ BITS

OTHER PUBLICATIONS

Y. Zhang et al., "An Information-Theoretic Approach to Traffic Matrix Estimation", *Proc. of ACM SIGCOMM'03*, Aug. 25-29, 2003, Karlsr8he, Germany.

Cisco ISO Software Netflow, http://www.cisco.com/warp/public/732/Tech/nmp/netflow/index.shtml.

N. G. Duffield et al., "Trajectory Sampling for Direct Traffic Observtion", *Proc. of ACM SIGCOMM'00*, Stockholm, Sweden, Aug. 2000, pp. 271-282.

A. C. Snoeren et al., "Hash-Based IP Traceback", *Proc. of ACM SIGCOMM'01*, Aug. 27,31, 2001, San Diego, California, pp. 3-14.

B. H. Bloom, "Space/Time Trade-offs In Hash Coding With Allowable Errors", *Commications of the ACM*, vol. 13, No. 7, Jul. 1970, pp. 422-426.

A. Broder et al., "Network Applications of Bloom Filters: A Survey*", *Allerton Conference 2002*, available at http://www.eecs.harvard.edu/~michaelm.

J. Byers et al., "Informed Content Delivery Across Adaptive Overlay Networks", *Proc. of ACM SIGCOMM'02*, Aug. 19-23, 2002, Pittsburg, Pennsylvania, pp. 47-60.

P. Flajolet et al., "Probabilistic Counting Algorithms for Data Base Applications", *Journal of Computer and System Sciences*, vol. 31, No. 2, Oct. 1985, pp. 182-209.

M. Durand et al., "Loglog Counting of Large Cardinalities", submitted to *European Symposium on Algorithms*, ESAS'2003, Apr. 2003.

C. Estan et al., "Counting the Number of Active Flows On A High Speed Link", *ACM SIGCOMM Computer Communications Review*, vol. 32, No. 3, Jul. 2002, p. 10.

P. B. Gibbons et al., "Estimating Simple Functions On The Union of Data Streams", *Proc. of ACM SPAA'01*, Crete, Greece, 2001, pp. 281-290.

A. Z. Broder et al., "On the Resemblance And Containment of Documents", *Compression and Complexity of Sequences 1997 Proceedings*, Positano, Italy, Jun. 1997.

Y. Vardi, "Network Tomography: Estimating Source-Destination Traffic Intensities From Link Data", *Journal of American Statistics Association*, vol. 91, 1996, pp. 365-377.

J. Cao et al., "Time-Varying Network Tomography: Router Link Data", *Journal of American Statistics Association*, vol. 95, 2000, pp. 1063-1075.

A. Z. Broder et al., "Min-Wise Independent Permutations", *Journal of Computer And System Sciences*, vol. 60, No. 3, 2000, pp. 630-659.

W-M Lin et al., "Look-Ahead Traffic Distribution In wormhold-Routed Networks", *Proceedings of Seventeenth IEEE Symposium On Reliable Distributed Systems*, Oct. 20-23, 1998, pp. 318-322.

* cited by examiner

EXTRACTION OF TRAFFIC DIGEST FROM A PACKET SET

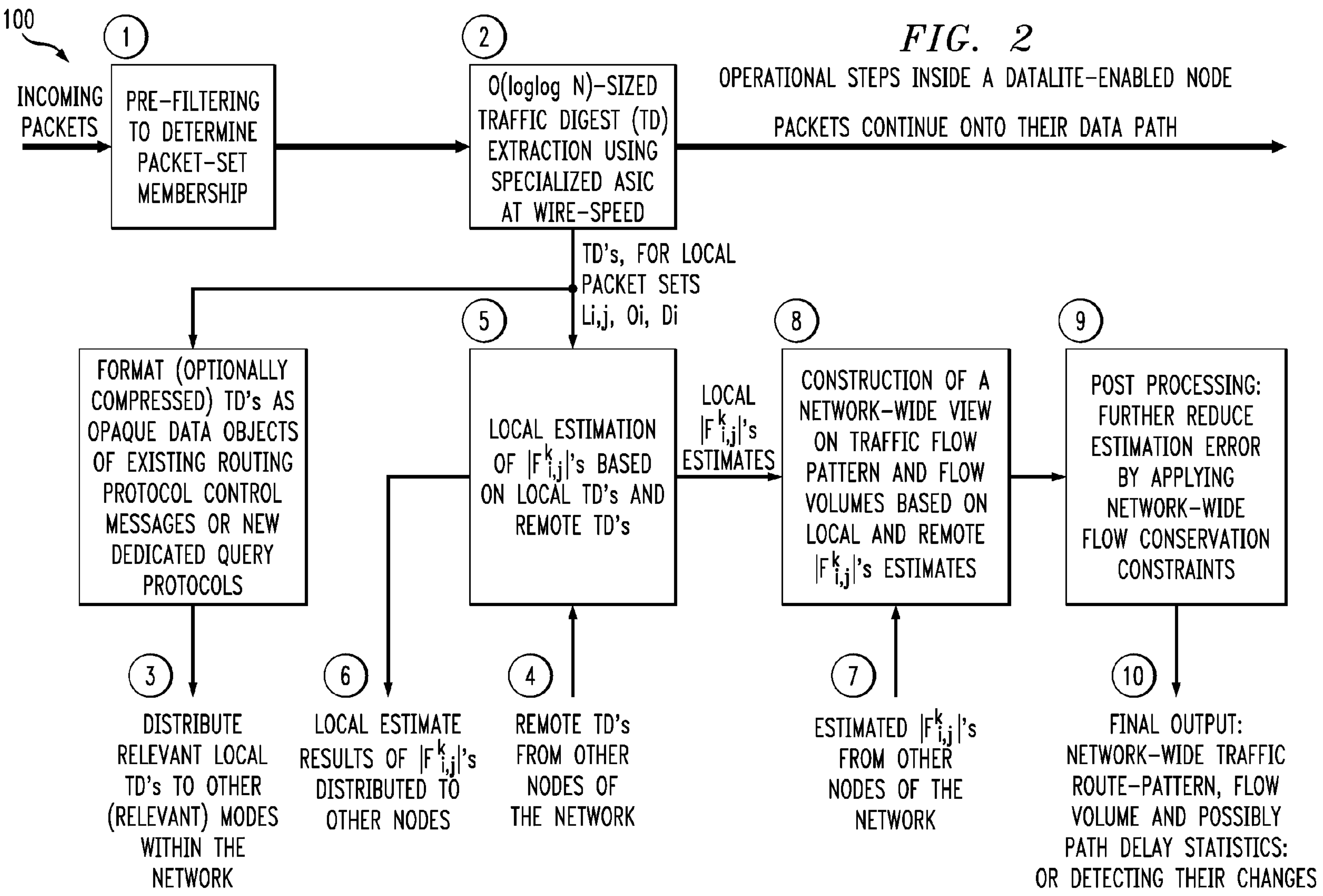
FIG. 2
OPERATIONAL STEPS INSIDE A DATALITE-ENABLED NODE
100
INCOMING PACKETS
1
PRE-FILTERING TO DETERMINE PACKET-SET MEMBERSHIP
2
O(loglog N)-SIZED TRAFFIC DIGEST (TD) EXTRACTION USING SPECIALIZED ASIC AT WIRE-SPEED
PACKETS CONTINUE ONTO THEIR DATA PATH
TD's, FOR LOCAL PACKET SETS Li,j, Oi, Di
3
FORMAT (OPTIONALLY COMPRESSED) TD's AS OPAQUE DATA OBJECTS OF EXISTING ROUTING PROTOCOL CONTROL MESSAGES OR NEW DEDICATED QUERY PROTOCOLS
DISTRIBUTE RELEVANT LOCAL TD's TO OTHER (RELEVANT) MODES WITHIN THE NETWORK
5
LOCAL ESTIMATION OF |F^k_i,j|'s BASED ON LOCAL TD's AND REMOTE TD's
4
REMOTE TD's FROM OTHER NODES OF THE NETWORK
6
LOCAL ESTIMATE RESULTS OF |F^k_i,j|'s DISTRIBUTED TO OTHER NODES
LOCAL |F^k_i,j|'s ESTIMATES
8
CONSTRUCTION OF A NETWORK-WIDE VIEW ON TRAFFIC FLOW PATTERN AND FLOW VOLUMES BASED ON LOCAL AND REMOTE |F^k_i,j|'s ESTIMATES
7
ESTIMATED |F^k_i,j|'s FROM OTHER NODES OF THE NETWORK
9
POST PROCESSING: FURTHER REDUCE ESTIMATION ERROR BY APPLYING NETWORK-WIDE FLOW CONSERVATION CONSTRAINTS
10
FINAL OUTPUT: NETWORK-WIDE TRAFFIC ROUTE-PATTERN, FLOW VOLUME AND POSSIBLY PATH DELAY STATISTICS: OR DETECTING THEIR CHANGES

HIGH-SPEED TRAFFIC MEASUREMENT AND ANALYSIS METHODOLOGIES AND PROTOCOLS

CROSS-REFERENCE TO RELATED APPLICATIONS

This application claims the benefit of the filing date of U.S. provisional application No. 60/558,230, filed on Mar. 31, 2004, the teachings of which are incorporated herein by reference.

FIELD OF THE INVENTION

The present invention relates generally to communications networks and more particularly to measurement and analysis of data packet communications networks.

BACKGROUND OF THE INVENTION

In recent years, the world has witnessed the proliferation of high-speed data networks and the rapid expansion of the set of protocols/services supporting these networks. The development of network monitoring and traffic measurement techniques have, so far, failed to catch up with the operating speed as well as the large-scale deployment of these networks. Because of this shortfall, network operators are increasingly losing their grasp on what exactly occurs in these networks. This, in turn, has jeopardized the ability to operate and manage the networks properly and efficiently. There is an urgent need of a comprehensive, yet deployable, network monitoring and end-to-end traffic analysis infrastructure for large-scale, high-speed networks. Such infrastructure is particularly important for connectionless data networks such as the Internet, in which routes of traffic flows can change dynamically and unpredictably in the middle of a session due to different types of expected or unexpected events. Such events include network component failures, non-deterministic load-balancing schemes (e.g. Equal Cost Multiple Path (ECMP)), software/hardware bugs and protocol mis-configurations. At present, most network operators can only rely on rudimentary diagnostic tools such as “traceroute”, to obtain woefully inadequate samplings of end-to-end routes of individual traffic flows within the network.

Recent research in traffic measurement/analysis methodologies and infrastructures has been strongly driven by the demands of a number of critical real-life applications such as the Origination-to-Destination (O-D pair) traffic matrix estimation for large scale ISPs and the support of traceback services in IP-based networks to tackle spoofed DDoS attacks. In the traffic matrix estimation problem as discussed in A. Medina, N. Taft, K. Salamatian, S. Bhattacharyya and C. Diot, “Traffic Matrix estimation: Existing Techniques and new directions,” in Procs. of ACM Sigcomm, August 2002 [Medi 02]; Y. Zhang, M. Roughan, N. Duffield, A. Greenberg, “Fast Accurate Computation of Large-Scale IP Traffic Matrices from Link Loads,” in Procs. of ACM Sigmetrics, June, 2003 [Zhang 03a]; and Y. Zhang, M. Rough, C. Lund and D. Donoho, “An Information-Theoretic Approach in Traffic Matrix Estimation,” in Procs. of ACM Sigcomm, August 2003 [Zhang 03b], the objective is to estimate traffic demands between O-D node-pairs in a large scale IP network using link-load measurements only. The origin of this problem stemmed from the lack of support of inexpensive, scalable per-flow counters by most commercial gigabit routers in the market. For example, while the Cisco Netflow technology, Cisco, IOS NetFlow. http://www.cisco.com/warp/public/732/Tech/nmp/netflow/index.shtml, can be used to collect fine grain per-flow traffic statistics, its formidable storage and bandwidth requirements make it unsuitable for 10 Gbps networks. To address such inadequacy/deficiency in the measurement infrastructure, researchers have resorted to combine link-load measurements with additional assumptions on O-D pair traffic distribution in order to estimate the required O-D pair traffic matrix. For instance, in [Medi 02, Zhan 03a, Zhan 03b], different variants of the gravity model are adapted from the field of transportation to model the network traffic distribution between all O-D pairs ; in [Vard 96] Y. Vardi, “Network Tomography: estimating source-destination traffic intensities from link data,” Journal of American Statistics Association, 91, pp. 365-377, 1996, [Vard 95], a Poissonian assumption is used to relate the 2nd order link-load statistics with O-D pair traffic distribution. Similar Gaussian assumption is made by J. Cao, D. Davis, S. V. Wiel and B. Yu, “Time-varying network tomography,” Journal of American Statistics Association, 95, pp. 1063-1075, 2000 [Cao 00] as well. In fact, the problem of estimating the O-D traffic matrix given only link-load measurements has led to the formation of a new field research called “Network Tomography”. Unfortunately, most of the network tomography-based solutions proposed to-date are highly sensitive, i.e. not robust, with respect to the validity of their traffic distribution assumptions. The tomography-based approach also heavily relies on the correctness, synchronization and consistency amongst multiple operational databases from which measurements/configuration information have to be extracted and collated. (Such databases include forwarding tables in the routers, the router configuration files, as well as SNMP MIBs for the link-load.) The aforementioned modeling and operational assumptions also render the tomography-based traffic measurement/estimation schemes of little use for network failure detection/diagnosis where neither the proper functioning of network elements/databases nor the normality of traffic distribution can be assumed.

Recently, an alternative packet trajectory-based traffic monitor/analysis approach has been proposed by N. G. Duffield, M. Grossglauser, “Trajectory Sampling for Direct Traffic Observation,” in Procs. of ACM Sigcomm, August 2000 pg. 271-282 [Duff 00] and A. C. Snoeren, C. Partridge, L. A. Sanchez, C. E. Jones, F. Tchakountio, S. T. Kent and W. T. Strayer, “Hash-based IP Traceback,” in Procs. of ACM Sigcomm, August 2001, pg. 3-14 [Snoe 01] in which each node (router) maintains a compressed summary, or a digest, of all the packets it recently handled. In both [Duff 00] and [Snoe 01], the digest is in the form of a Bloom filter, see, for example, B. Bloom, “Space/Time trade-offs in hash coding with allowable errors,” Communications of the ACM 13, July 1970, pp. 422-426, [Bloo 70] and , A. Broder, M. Mitzenmacher, “Network Applications of Bloom Filters: A Survey,” Allerton Conference, 2002, available at http://www.eecs.harvard.edu/~michaelm , [Brod 02] which is updated for every packet arriving at the node and periodically uploaded to some centralized server to support future offline traffic analysis as well as archival purposes. Armed with these very informative nodal traffic digests, the centralized server can not only construct the traffic flow pattern and per-flow/commodity measurements throughout the network, but also answer queries regarding the end-to-end path, or the so-called trajectory, of any given packet traversing the network in the (recent) past. The ability of answering trajectory query for any given individual packet does come with a heavy cost: the Bloom filter has to be big enough to store sufficient information for every individual incoming packet. Even with the efficient memory vs. false-positive-trade-off of a Bloom filter, it still requires O(N) bits of memory to capture and correctly distinguish the signatures of N different packets with high probability. In [Snoe 01], it is estimated that such a system requires approximately 0.5% of link capacity of the node per unit time in storage. For a 10 Gbps link, this translates to 50 Mbits of storage for every one second of monitoring time. Such a heavy-weight traffic digest approach not only stresses the memory storage and communication requirements of the system but also scales poorly as the link speed and/or monitoring duration increases.

SUMMARY OF THE INVENTION

An advance over the prior art is achieved through an efficient method for network traffic analysis termed a Distributed Architecture for Traffic Analysis via LIght-weight Traffic digEst (DATALITE), which introduces a set of new distributed algorithms and protocols to support general Traffic Measurement and Analysis (TMA) functions for large-scale, 10 Gbps+ packet-switched networks. These functions include, but are not limited to:

- Traffic flow pattern/route monitoring, diagnosis and network forensic;
- Estimation of Origination-to-Destination (OD) traffic load matrix for capacity planning and traffic engineering purposes;
- Traffic measurements for end-user accounting/billing as well as Inter-ISP (ASes) charge-settlement purposes;
- Traceback on the origin(s) of attacking packets in a distributed denial of service (DDOS) attacks.

We formulate the network-wide traffic measurement/analysis problem as a series of set-cardinality-determination (SCD) problems. By leveraging recent advances in probabilistic distinct sample counting techniques, the set-cardinalities, and thus, the network-wide traffic measurements of interest can be computed in a distributed manner via the exchange of extremely light-weight traffic digests (TD's) amongst the network nodes, i.e. the routers. A TD for N packets only requires O(loglog N) bits of memory storage. The computation of such O(loglog N)-sized TD is also amenable for efficient hardware implementation at wire-speed of 10 Gbps and beyond.

Given the small size of the TD's, it is possible to distribute nodal TD's to all routers within a domain by piggybacking them as opaque data objects inside existing control messages, such as OSPF link-state packets (LSPs) or I-BGP control messages. Once the required TD's are received, a router can estimate the traffic measurements of interest for each of its local link by solving a series of set-cardinality-determination problems. As we will discuss in a later section, the traffic measurements of interest are typically in form of per-link, per-traffic-aggregate packet counts (or flow counts) where an aggregate is defined by the group of packets sharing the same originating and/or destination nodes (or links) and/or some intermediate nodes (or links). The local measurement results are then distributed within the domain so that each router can construct a network-wide view of routes/flow patterns of different traffic commodities where a commodity is defined as a group of packets sharing the same origination and/or termination nodes or links. After the initial network-wide traffic measurements are received, each router can further reduce the associated measurement/estimation errors by locally conducting a minimum square error (MSE) optimization based on network-wide commodity-flow conservation constraints.

In addition to the support of the "broadcast" mode where the network is periodically flooded with light-weight TD's and resultant local traffic estimates, DATALITE also supports traffic measurements/analysis via a "query-and-answer" mode in which the distribution of TD's and local traffic estimates are conducted in an on-demand, need-to-know basis by a relevant subset of nodes within the network. The query-and-answer mode is particularly useful for supporting occasional special traffic studies where extra fine-grain, high-precision traffic measurements/analysis is needed.

In summary, by taking a direct-measurement approach, DATALITE avoids the problems caused by invalid traffic modeling or operational assumptions which plague the network tomography approaches. Although there are some high-level commonalities between the DATALITE scheme and the existing trajectory-based ones, there are key differences between them: First, by formulating the traffic measurement problem as a series of set-cardinality-determination problems, we can leverage recent advances in distinct sample counting to perform traffic analysis in a distributed manner with minimal communications overhead. Second, by focusing on the measurements and analysis of traffic aggregate behavior instead of individual packet ones, the system memory and communication bandwidth requirements for DATALITE are much reduced. As a result, it is possible for DATALITE to adopt a distributed computational model as opposed to the heavy-weight, centralized approach taken by existing trajectory-based systems.

BRIEF DESCRIPTION OF THE DRAWINGS

A more complete understanding of the present invention may be obtained from consideration of the following detailed description of the invention in conjunction with the drawing, with like elements referenced with like references, in which:

FIG. 2 is an exemplary embodiment for the steps carried out by a network node utilizing the traffic measurement and analysis techniques of the present invention.

DETAILED DESCRIPTION

Figure 1:
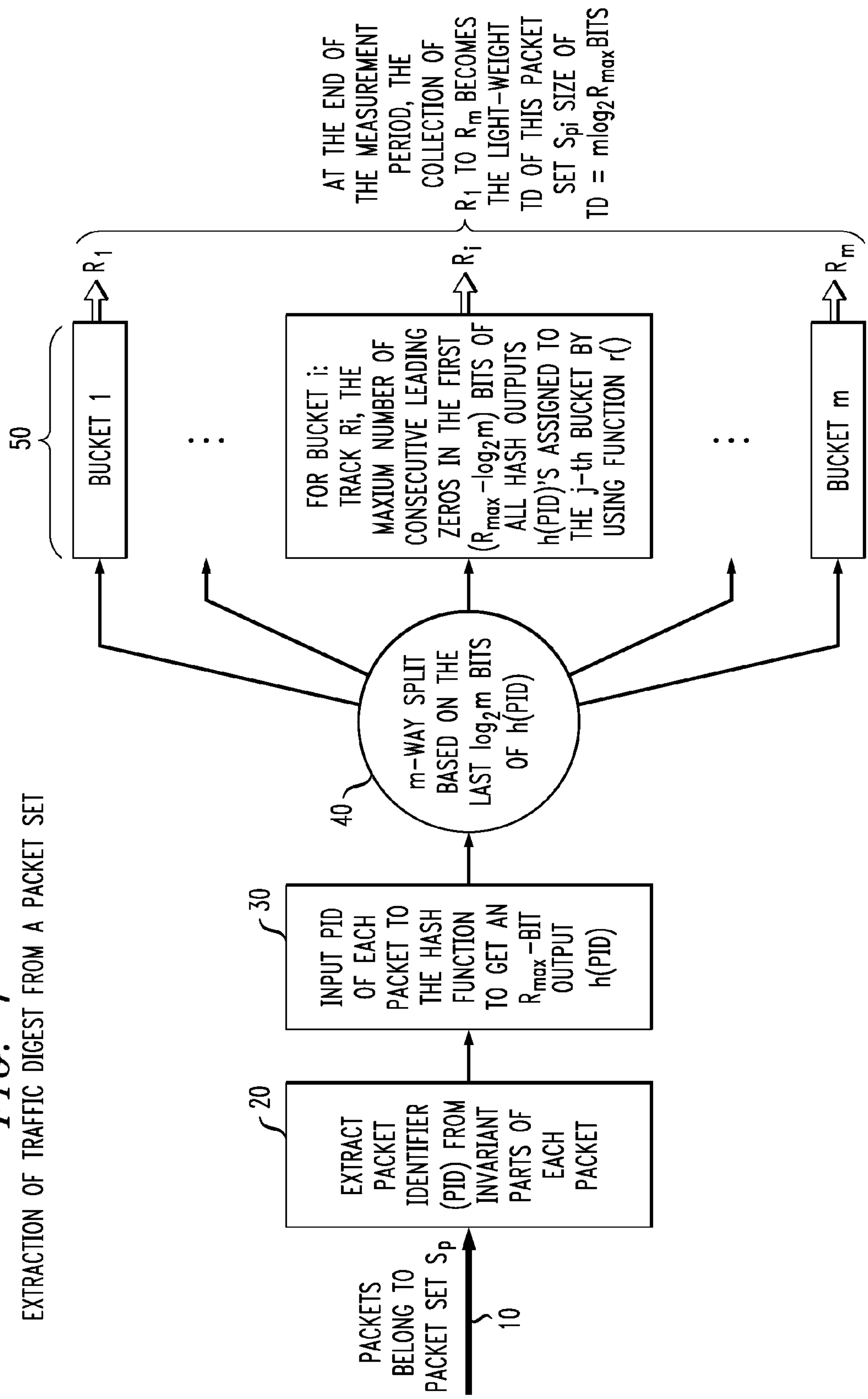
FIG. 1 illustrates one exemplary methodology for extraction of a traffic digest from a packet set according to the present invention.

The present invention is a methodology for providing improved efficiency for network measurement and analysis in data packet networks. Although an exemplary embodiment of the invention is described in connection with conventional high speed networks, it would be apparent to those skilled in the art that the present invention is applicable to other networks such as wireless networks and transportation networks.

While the ability to answer a trajectory query for any given individual packet was considered to be necessary for the designers in [Snoe 01] to support IP traceback, the inventors herein argue that it is an overkill for most traffic measurement/analysis applications, including IP traceback. The argument is based on the observation that, in most of these applications, it suffices to know the trajectory and/or the traffic volume of a given group of packets, or a so-called traffic aggregate instead of those of a bunch of individual, isolated packets. While one may argue that the system in [Snoe 01] can support more powerful network forensic applications such as the tracking of the origin of a single special packet, we believe network level traffic analysis/monitoring may not be the best way to provide such function. Instead, specific application-level forensic functions can be better supported at the application level near the end-systems. It is our view that a network traffic monitoring/analysis infrastructure should focus its effort on supporting network and/or transport layers of functions, such as routing diagnosis, traffic engineering and flow-pattern analysis.

In most cases, the definition of the traffic aggregate of interest is clearly defined in the context of the application. In the present invention, a Distributed Architecture for Traffic Analysis via LIght-weight Traffic digEst (DATALITE), we will primarily focus on traffic aggregates which are defined in terms of:

(1) their originating and/or terminating nodes (or links) or (2) the set of specific link(s) or node(s) traversed by that group of traffic.

We decide to focus on such definitions of aggregates because, as we will show below, such traffic aggregates are central to a wide range of practical traffic measurement/analysis (TMA) applications including traffic matrix estimation, route examination, as well as network failure diagnosis. In addition to these primary types of traffic aggregates, the proposed DATALITE infrastructure also supports more fine-grain traffic aggregates which are subsets of the primary ones, e.g. group of packets of a given protocol-type and/or port number Traffic Measurement/Analysis as an Intersection-Set-Cardinality-Determination Problem In this subsection, we describe the formulation of the traffic measurement/analysis (TMA) problem as a series of intersection-set-cardinality-determination (ISCD) problems. Consider the directed graph representation of a network G=(V, E) where V is the set of nodes and E is the set of directional links. Let (i,j)∈E be the directional link from node i to node j. Let $L_{i,j}$ be the set of packets traversing over link (i,j) during a given measurement period of length T seconds. For now, let's assume the measurement period to be much longer than the maximum end-to-end delay within the network so that the fringe effects caused by in-flight packet can be neglected The effect of path delay can be accounted for by keeping multiple time-indexed nodal traffic digests. In fact, time-indexed traffic digests can be used to support network path delay measurements. Let $O_i$ (or $D_i$) be the set of packets originated (or terminated) at node i during the same measurement period. By "originated" (or "terminated"), we mean the packets actually being generated from the node (or exit the network from there). We avoid use of the words "source" or "destination" because, a packet may not actually be generated at the source node that it claims due to possible source address spoofing. Similarly, a packet may not actually arrive at its intended destination node, e.g., due to routing problems or loss.

During the given measurement period, the traffic aggregates of our interest can be readily represented as the intersection of the packet sets defined above. To illustrate our approach, let's consider the following two common (and fundamental) TMA tasks:

Sample TMA Task #1

The objective of this task is to determine the route pattern and volume of traffic between all O-D node-pair in the network. Towards this end, consider the set of packets $F_{i,j}^k$, that pass through link (i,j)∈E, with k=(s,d)∈V×V as their O-D node pair. Notice that $F_{i,j}^k$ can be expressed as the intersection of other packet sets defined above, namely, $F_{i,j}^k=O_s\cap L_{i,j}\cap D_d$. A key observation is that, for this task, (as well as in a wide range of other TMA applications such as traffic matrix estimation, flow-pattern analysis, traffic-traceback, route/network failure detection/diagnosis as well as traffic engineering), it is sufficient to know the cardinality of $F_{i,j}^k$, i.e., $|F_{i,j}^k|$, instead of the full details of $F_{i,j}^k$. For instance, the objective of sample TMA Task#1 can be achieved by knowing only $|F_{i,j}^k|$'s for every link (i,j)∈E and all O-D node-pair k=(s,d)∈V×V.

Sample TMA Task#2

In this task, we consider the traceback application where we want to determine the originating nodes, the traffic volume they contribute, as well as the upstream flow pattern of the group of packets which arrive and are terminated at a given downstream node d, which may be some DDoS victim. To accomplish this task, we only need to determine $|F_{i,j}^k|$ for every link (i,j)∈E where $F_{i,j}^k=L_{i,j}\cap D_d$ and k=(*,d), (where * is the wildcard). Similarly, one can trace the destination, downstream route pattern and flow volume for of packets originating from a given node s by determining $|F_{i,j}^k|$ for every link (i,j)∈E where $F_{i,j}^k=O_s\cap L_{i,j}$ and k=(s,*).

Based on the above observation, the basic idea of DATALITE is to provide an infrastructure to support the distributed computation/estimation of $|F_{i,j}^k|$ in a network-wide manner where $F_{i,j}^k$ is expressed in form of the intersection of some packet sets such as the $O_i$'s, $D_d$'s and $L_{i,j}$'s mentioned above. As will be discussed herein, by focusing on the $|F_{i,j}^k|$'s instead of the full details of $F_{i,j}^k$'s (as in the case of [Duff 00, Snoe 01]), the system storage and communications bandwidth requirements for DATALITE can be much reduced which enables DATALITE to support TMA in 10 Gbps+ networks.

By expressing $F_{i,j}^k$ as the intersection of some specific packet sets, our formulation has effectively transformed the TMA problem to a series of so-called intersection-set cardinality determination (ISCD) problems. The problem of determining the cardinality of the intersection of multiple sets distributed over different locations has been investigated recently in the contexts of (1) helping search engines to identify similar webpages over the WWW , A. Broder, "On the resemblance and containment of documents," in Compression and Complexity of Sequences (SEQUENCES), Positano, Italy, June 97 [Brod 97] and (2) designing protocols to support efficient file-search/swapping over peer-to-peer networks, J. Byers, J. Considine, M. Mitzenmacher and S. Rost, "Informed Content Delivery Across Adaptive Overlay Networks," in Procs. of ACM Sigcomm, August 2002 [Byer 02]. [Brod 97] and [Byer 02] both apply the "Min-wise independent permutation" technique of A. Broder, M. Charikar, A. M. Frieze and M. Mitzenmacher, "Min-wise independent permutations," Journal of Computer and System Sciences, 60 (3), 2000, pp. 630-659. [Brod 00] to estimate the so-called resemblance ratios of $|A\cap B|/|A\cup B|$ for a pair of sets A and B. However, the amount of information exchange required by this technique is proportional to the size of the sets of interest, i.e. O(|A|) or O(|B|). This is not viable for our high-speed TMA applications where |A| or |B| corresponds to the number of packets traversing a given link during the measurement period: for a 40 Gbps link with 40-byte packets and a measurement period of 10's of seconds, |A| can easily be in the range of billions. An alternative approach based on the exchange of nodal Bloom-filters (as alluded to by [Duff 00, Snoe 01]) also runs into excessive storage/communication bandwidth problems because of similar O(|A|) memory requirements of the corresponding Bloom filters.

Distributed Intersection-Set-Cardinality-Determination Via Distinct Sample Counting The present invention, DATALITE, takes a new approach to solve the distributed ISCD problem: We first transform the ISCD problem to one or more union-set cardinality determination (USCD) problems. We then apply recent O(loglog |A|) distinct sample counting algorithms to solve the USCD problem in a distributed manner. In fact, our approach can be used for the aforementioned applications in [Brod 97] and [Byer 02] to drastically improve their performance and scalability.

As an illustration, recall Sample TMA Task #2 where $F_{i,j}^{k}=O_s \cap L_{i,j}$. Based on elementary set theory, $|F_{i,j}^{k}|$ can be expressed in form of:

$$|F_{i,j}^{k}|=|O_s \cap L_{i,j}|=|O_s|+|L_{i,j}|-|O_s \cup L_{i,j}| \qquad \text{Eq.(1)}$$

where $|O_s|$ is the number of distinct packets originated at node s during the measurement period. By definition, every packet generated is distinct and thus, $|O_s|$ can be maintained as a single packet counter for every originating network node. $|L_{i,j}|$ is the number of distinct packets traversing link (i,j). We will apply the probabilistic distinct sample counting technique pioneered by Flajolet, Martin and Durand, P. Flajolet, G. N. Martin, "Probablistic counting algorithms for database applications," Journal of Computer and System Sciences, 31 (2), 1985, pp. 182-209 [Flaj 85] and M. Durand, P. Flajolet, "Loglog Counting of Large Cardinalities," submitted to European Symposium on Algorithms, ESA'2003, April 2003 [Dura 03] to keep track of $|L_{i,j}|$ for every link (i,j)∈E. A key advantage of such technique is that it only requires one to maintain an O(loglog $N_{max}$)-bit digest to summarize the necessary information in the packet set $L_{i,j}$ where $N_{max}$ is the maximal number of distinct samples in $L_{i,j}$. In the context of the present invention, we will refer to this digest as the traffic digest (TD) of $L_{i,j}$, denoted by $TD_{L_{i,j}}$. Besides maintaining $TD_{L_{i,j}}$, we also introduce a simple packet counter $C_{i,j}$ for every link (i,j)∈E to track the simple count of packets (including duplicates) passing through the link during the same measurement period. A large discrepancy between the values of $C_{i,j}$ and $|L_{i,j}|$ would indicate potential routing problems as link (i,j) may have become part of a routing loop. Thus, the remaining challenge in the evaluation of $|F_{i,j}^{k}|$ is to compute $|O_s \cup L_{i,j}|$. Incidentally, the probabilistic distinct sample counting technique used for estimating $|L_{i,j}|$ can also be extended to compute $|O_s \cup L_{i,j}|$ in a distributed manner. This is based on the exchange of O(loglog $N_{max}$)-sized TD's for the packet sets $O_s$ and $L_{i,j}$ denoted by $TD_{O_s}$, and $TD_{L_{i,j}}$, and maintained locally by node s and node i respectively. Similarly, the $|F_{i,j}^{k}|$ for Sample TMA Task #1 can be expressed as:

$$|F_{i,j}^{k}|=|O_s \cap L_{i,j} \cap D_d|=|O_s|+|L_{i,j}|+|D_d|-|O_s \cup L_{i,j}|-|L_{i,j} \cup D_d|-|D_d \cup O_s|+|O_s \cup L_{i,j} \cup D_d| \qquad \text{Eq.(2)}$$

Again, the aforementioned O(loglog $N_{max}$), distinct sample counting technique can be used to determine the cardinalities of the union-sets in the R.H.S. of Eq.(2). In short, the TMA problem can be transformed to the determination of the cardinalities of the unions of some specific packet sets. More importantly, this approach only requires a single light-weight TD per link, (plus one simple packet counter per link) to determine the network-wide route-patterns and per-link traffic volumes for the $|V|^2$ types of packets based on O-D node-pair classification. By identifying the links of a router i through which packets actually enter (depart) the network, one can derive the TD's for the originating (terminating) packet sets of the router i based on the TD's of those links. It is therefore no need to maintain $T_{o_i}$ and $T_{D_i}$ explicitly.

In general, it is possible to express the cardinality of the intersection of multiple sets in terms of the cardinalities of a series of union sets. In particular, for list of sets $S_1, S_2, \ldots, S_n$, $$\left|\bigcap_{i=1}^{n} S_i\right| = \qquad \text{Eq. (3)}$$

-continued $$\sum_{i=1}^{n}|S_i| - \sum_{i\neq j}|S_i \cup S_j| + \sum_{i\neq j\neq k}|S_i \cup S_j \cup S_k| \ldots + (-1)^{n-1}\left|\bigcup_{i=1}^{n} S_i\right|$$

Eq.(3) will become useful when we apply additional set intersections to refine the definition of the traffic aggregate of interest, e.g. all 40-byte TCP packets with O-D pair (s,d) traversing link $l_{i,j}$. Based on Eq.(3), an ISCD problem can always be transformed to the computation of the cardinalities of the union of sets in the R.H.S. of Eq. (3). This, in turn, can be done in a distributed manner using the distinct sample counting technique. In summary, the solution approach of the present invention consists of the following steps:

1. Transform the TMA problem of interest to the problem of determining the cardinalities of some intersection sets of interest, or the so-called intersection-set-cardinality-determination (ISCD) problems.
2. Using Eq. (3), transform ISCD problem to the problem of determining the cardinalities of some union-sets of interest, or the so-called union-set-cardinality determination (USCD) problem.
3. Solve the USCD problems in a distributed manner using distinct sample counting techniques pioneered by Flajolet, Martin and Durand [Dura 03].

In the following subsection, we will review the "Loglog distinct sample counting" techniques by Flajolet, Martin and Durand and then explain how they can be applied in the context of the DATALITE invention. On a related note, C. Estan, G. Varghese, and M. Fisk, "Counting the number of active flows on a high speed link," *ACM Computer Communication Review*, vol. 32, no. 3, July 2002 [Esta 02] has designed variants of the distinct sample counting algorithms in [Flaj 85] to estimate the local network flow counts on a high-speed link. In DATALITE, we apply the techniques in [Dura 03] to estimate the number of distinct packets in some union-set of packets whose elements (packets) are observed at geographically distributed locations. Alternative distinct sample counting techniques for distributed union sets have also been proposed in P. B. Gibbons, S. Tirthapura, "Estimating Simple Functions on the Union of Data Streams," in Procs. of ACM SPAA, Crete Island, Greece, 2001 [Gibb 01]. However, the memory requirement of the scheme proposed in [Gibb 01] is not as attractive as that of [Dura 03].

Review of the Loglog Distinct Sample Counting Techniques

Consider a set of samples S where each packet s has an identifier $id_s$. Samples carrying the same identifier are treated as duplicates. [Dura 03] solves the problem of counting the number of distinct samples in S, i.e. |S|, with O(loglog $N_{max}$) bits of memory where $N_{max}$ is the maximum number of distinct samples in S. Their scheme works as follows:

Firstly, the identifier of each sample is used as the input to a hash function h(·), which outputs a random non-negative integer uniformly distributed over the range of $[0,2^{R_{max}}-1]$ where $2^{R_{max}}$ should be greater than $N_{max}$. Consider the binary representation of the hash output as a random binary string of $R_{max}$ bits long. Intuitively, since the output of h(·) is uniformly distributed, if there are n distinct samples in S, on average, $n/2^k$ of them will have an output from h(·) with (k−1) consecutive leading zeroes followed by a bit of "1". (Since duplicate samples will have the same output in h( ), they will collectively contribute to 1 random trial only.)

Define r(x) to be the function which takes a binary string x as input and output the value of (1+the maximum number of consecutive leading zeros in x). For example, for x=00001XXX . . . , r(x)=5; for x=1XXX . . . , r(x)=1 where X represents "don't-care". Let $$R(S) = \max_{s \in S}\{r(h(id_s))\}$$

be the maximum value of r(h(·)) attained while considering all sample identifiers in S as inputs. R(S) should therefore give a rough indication on the value of $\log_2$ n. In fact, R is precisely distributed in the same way as 1 plus the maximum of n independent geometric variables of parameter 1/2. It can be shown that R estimates $\log_2$ n with an additive bias of 1.33 and a standard deviation of 1.87. In practice, in order to reduce the estimation error, one can use different hash functions to obtain multiple values of R and use their average to estimate $\log_2$ n. Alternatively, one can use the so-called Stochastic Averaging Algorithm (SAA) with the following steps to estimate n (or |S| equivalently):

1. Separate the samples of the set S into $m=2^k$ buckets based on, say, the last k bits of the hash output of a sample.
2. Let $R_j$ be the value of R for the j-th bucket. Compute the $R_j$'s for 1≦j≦m by inputting the ($R_{max}$−k) leading bits of the hash output of each sample to r(·).
3. Compute n̂, i.e. the estimate of |S|, using the following formula:

$$\hat{n} = \alpha_m m 2^{\frac{1}{m}\sum_{j=1}^{m} R_j} \quad \text{Eq. (4)}$$

where $\alpha_m$ is a correction factor, which is a function of m.

As shown in [Dura 03], the standard error σ of n̂ is given by:

$$\sigma=1.05/\sqrt{m} \quad \text{Eq.(5)}$$

For example, a 2% standard error can be achieved by setting m=2048.

Recall that $N_{max}$ is the maximal number of distinct samples in S. Since the average number of distinct samples within each bucket is about $N_{max}$/m, we should therefore provision for the maximum value of $R_j$'s, denoted by $R_{max}$ so that $2^{R_{max}}>N_{max}/m$. In [Dura 03], it has been shown that the number of bits required for the binary representation of each of the m $R_j$'s is equal to:

$$\log_2 R_{max}=\lceil\log_2(\lceil\log_2(N_{max}/m)\rceil+3)\rceil \quad \text{Eq.(6).}$$

Thus, the working memory requirement, M, for this probabilistic distinct sample counting scheme is given by:

$$M=m\log_2 R_{max}\text{ bits} \quad \text{Eq.(7)}$$

Note that the above distinct sample counting scheme is readily amenable for distributed implementation where the samples of the set S are observed (or stored) at separate locations: Let $$S = \bigcup_{p=1}^{P} S_p$$

where the sets $S_p$'s are maintained in P separate locations. We can estimate the number of distinct samples in S, denoted by $$|S| \text{ (or } \left|\bigcup_{p=1}^{P} S_p\right|\text{)},$$

in a distributed manner according to the Distributed Max-merge Algorithm (DMA) with the following steps:

1. At each location p, update the value of R for each of the m buckets based on samples in $S_p$. Let $R_j^p$ be the value of R for the j-th bucket in location p where 1≦j≦m and 1≦p≦P. We can consider the collection of the m values of $R_j^p$'s to be a light-weight digest of $S_p$.
2. At the end of a measurement period, exchange the collection of $R_j^p$'s, for 1≦j≦m and 1≦p≦P, among all of the P locations.
3. At each location, perform max-merge of the $R_j^p$'s by setting $$R_j = \max_{1 \le p \le P} R_j^p$$

for 1≦j≦m.

4. At any of the P locations, one can then obtain the estimate of $$|S| \text{ (or } \left|\bigcup_{p=1}^{P} S_p\right|\text{)},$$

by substituting the max-merged $R_j$'s resulted from Step 3 into Eq.(4) of the SAA discussed above.

Referring to FIG. 1, let us describe how the above distinct sample counting schemes, i.e. the SAA and DMA, can be applied in the context of the present invention. In this case, various packet sets of interest within the network become the sample sets 10. The packets become the samples to be examined and the sample (or packet) identifier is constructed from the concatenation of some selected fields in the packet header, and possibly some specific parts of the payload as shown at step 20. A key requirement of the packet identifier is that it should remain unchanged as a packet traverses through the network. As a result, some fields such as the TTL-field in an IP-header preferably should not be included as part of the packet identifier. We are well aware of the practical issues which may inadvertently modify the packet identifier as a packet traverses through a network, e.g. IP fragmentation along the packet path, or use of additional encapsulation/tunneling within the network. We address these issues by handling the packets with prevalent impact as special cases, and accounting for the remaining ones as additional traffic measurements errors.

For a given packet set of interest, the collection of m $R_j$'s (as defined in the SAA) becomes the traffic digest (TD) of the packet-set. FIG. 1 summarizes how the TD of a packet-set can be extracted from its packets. For example, at step 30, the packet identifier (PID) of each packet is input to a hash function to get an $R_{max}$-bit hash output h(PID). The output from step 30 is input to an m-way splitter at step 40. Here, an m-way split occurs based on the last $\log_2$m bits of h(PID). At step 50 for each of the 1 through m buckets, $R_i$ is tracked, where the maximum number of consecutive leading zeroes in the first $R_{max}$−$\log_2$m) bits of all hash outputs h(PID)s assigned to the $i^{th}$ bucket by using the function r( ). At the end of the measurement period, the collection of R1 to Rm becomes the light-weight TD of the packet set of interest $S_p$, where size of the TD is m $\log_2 R_{max}$ bits.

The Operational Model of DATALITE

We now describe the operational steps within the present invention DATALITE-enabled network in order to support a TMA task. We will use the Sample TMA Task #1 described previously as an illustrative example. In this case, each node i∈V maintains a light-weight traffic digest (TD) (in form of the collection of the m $R_j$'s in the SAA) for each of its local packet sets of interest, namely, the set of packets it originates, ($O_i$), the set of packets it terminates ($D_i$), and the set of packets ($L_{i,j}$) traversing each of its link (i,j)∈E. We denote the corresponding TD's of these packet sets by $TD_{o_i}$, $TD_{D_i}$ and $TD_{L_{i,j}}$ respectively. In addition to the use of simple counters to track per-link packet counts ($C_{i,j}$) (without packet duplicates considerations) and packet generation counts ($|O_i|$), each router tracks the local distinct packet counts of interest, i.e. the $|L_{i,j}|$'s and $|D_i|$ using the SAA together with the information contained in the $TD_{L_{i,j}}$'s and $TD_{D_i}$. Furthermore, node i can estimate the values of $|F_{i,j}^k|$'s in Eq. (2) for all of its links (i,j)∈E and all k=(s,d)∈V×V after receiving $TD_{o_j}$ and $TD_{D_j}$ from all nodes j∈V . In particular, the cardinalities of the union sets on the R.H.S. of Eq.(2) can be estimated by substituting $O_s$, $D_d$ and $L_{i,j}$ as the $S_p$'s in the DMA where the exchange of the $R_j^p$'s is replaced by the distribution of $TD_{o_s}$ and $TD_{D_d}$ from nodes s and d to node i respectively. Once the estimates of $|F_{i,j}^k|$'s are computed locally by node i, they can be distributed to other network nodes via periodic broadcast or in an on-demand, query-and-answer basis. Each node can then construct the network-wide view of the traffic aggregates of interest based on the knowledge of $|F_{i,j}^k|$'s. To further reduce the measurement/estimation errors on the $|F_{i,j}^k|$'s , e.g. due to the probabilistic nature of the schemes in [Dura 03], each node can optionally perform a minimum square error (MSE) optimization based on nodal and network-wide flow conservation constraints expressed in terms of the $|F_{i,j}^k|$'s. The details of such MSE optimization will be discussed in the next subsection. FIG. 2 summarizes the above operational steps performed by a DATALITE-enable node.

Referring to FIG. 2, a flow diagram is shown for a node 100 having a processor or processors for implementing the methodology of the present invention. As shown, at step 1, incoming packets enter the node 100 and are pre-filtered to determine packet set interest. At step 2, a traffic digest (TD) is extracted, e.g. an O(loglog N) sized TD is extracted in a manner previously explained. Packets then continue on their data path. At step 3 of FIG. 2, TDs are distributed to other relevant nodes within the network, e.g., within the packet set of interest. The TDs may be optionally compressed in a known manner and/or formatted as data objects of an existing routing protocol control message or as a new dedicated query protocol. At step 4, remote TDs from other relevant nodes within the network are received at node 100. At step 5, a local estimation of a given aggregate flow $|F_{i,j}^k|$ is determined based on local TDs and remote TDs that have been distributed. The local estimate of the given aggregate flow is then also distributed to the other relevant nodes. At step 7, the estimated aggregate flows $|F_{i,j}^k|$ from other relevant nodes within the network is received at node 100. At step, with the aggregate flow estimates received from the other nodes in the network, construction of a network wide view on traffic flow pattern and volumes is determined based on the local and remote aggregate flow estimates. At step 9, post processing occurs, to , for example, further reduce the estimation error by applying network wide flow conservation constraints. At step 10, a final output is provided for, for example, network-wide traffic route patterns, flow volumes and/or possible path delay statistics. The output may also detect changes to one or more of the above parameters.

Notice that, by only distributing the TD's of the origination and termination packet sets (i.e. the $O_i$'s and $D_i$'s for all i∈V ), but not the TD's of the $L_{i,j}$'s, we reduce the communication bandwidth requirement of DATALITE substantially. This is because, even with the light-weight nature of the $TD_{L_{i,j}}$'s, they are still not as small as the $|F_{i,j}^k|$'s. Also, since there are typically much fewer nodes than links in a practical network, the number of $TD_o$'s and $TD_{D_i}$'s are also much smaller than that of $TD_{L_{i,j}}$'s.

Considerations and Optimization of Memory and Communication Bandwidth Requirements for DATALITE One of the key design/engineering challenges is to maintain (1) the local memory requirement for the TD's and (2) the inter-node communication bandwidth requirements, to an acceptable level, while satisfying the estimation error requirements for the TMA application of interest. Towards this end, we propose the following multi-prong strategy:

1. Judicious Control of Memory Size Per TD

Consider the memory requirement of a TD to support TMA tasks in 10 Gbps+ networks. Since a 40 Gbps link can transfer a maximum of 125 millions of 40-byte packets every second, a value of $10^{12}$ or $2^{40}$ should be adequate for $N_{max}$ (in Eq.(6)) to support measurement periods up to 8000 seconds long. According to Eq.(5), in order to achieve a standard error $\sigma \leqq 2\%$ for the distinct sample count estimate, m should be $\geqq 2048$. Substituting $N_{max}=2^{40}$ and of m=2048 into Eq. (6) yields $R_{max}=32=2^5$. In other words, it is sufficient to allocate 5-bits to encode each of the $R_j$'s in a TD. Thus, the memory requirement M=m $\log_2 R_{max}$ (bits) of each TD is dictated by the value of m. For m=2048, which corresponds to a standard error of 2% for the corresponding distinct sample count estimate, the size of a TD is about 1.7 KByte. We consider this to be a lower bound on the memory requirement of each TD in order to account for possible estimation error accumulation and/or "amplification" during the evaluation of the ultimate metric of interest, e.g., the $|F_{i,j}^k|$'s of the sample TMA tasks discussed previously. This is because, according to Eq. (3), the estimation error of the term on the L.H.S. of Eq.(3) is the sum of the estimation errors of each term on the R.H.S. Thus, the more stages of set-intersection in the L.H.S. term, the larger the estimation errors as the estimation errors for the union-set cardinalities on the R.H.S. of Eq.(3) accumulate. Furthermore, since $\sigma=1.05/\sqrt{m}$ is a "relative" estimation error with respect to each of the union-set cardinalities in the R.H.S. of Eq. (3), the corresponding relative estimation error, i.e. percentage-wise, for the intersection-term on the L.H.S. of Eq.(3) can get "amplified" especially when the cardinality of the intersection set on the L.H.S. of Eq.(3), is, in absolute terms, much smaller than that of the union-set terms on the R.H.S.

In practice, the actual value of m, and hence the memory-size per $TD_{D_i}$'is determined based on the estimation error requirements of the TMA application. For those TMA applications where rough estimates/measurements are sufficient, we will use a coarser-grain, smaller-sized TD's, such as the 1.7 Kbyte TD may be sufficient. Examples of this type of TMA applications include route failure/mis-configuration/change detection as well as DDoS attack traceback where the event of interest will typically cause drastic changes in traffic flow pattern. As a result, and the values of $|F_{i,j}^k$'s would deviate substantially from their nominal values and the estimation error is insignificant with respect to the sudden deviation. For the TMA applications where quantitative, highly accurate measurements are required, we can increase m (and thus decrease σ) during the estimation of each of "union-wise" terms on the L.H.S. of Eq.(3). However, since a linear decrease in σ requires a quadratic increase in the size of TD, such memory vs. accuracy trade-offs should be conducted in a judicious manner. Fortunately, due to the inherent light-weight nature of the TD, there is considerable room for one to scale up its memory size. For instance, a 512-fold increase of TD size from 1.7 KByte to 0.87 MByte can reduce σ to below 0.08%. Yet, a 0.87 MByte TD is still very reasonable with current fast memory technologies. That is, today, the typical amount of memory for a 10 Gbps line-card is about 2 Gbits. This is to provide a 200 msec-worth of buffering. Using 10% of this amount of memory, i.e. 25 MBytes, for traffic measurement/analysis purpose, it means each line-card can accommodate more than 28 0.87 MByte TD's. In this research, we will investigate the means to support multiple sizes of TD's in parallel.

2. Efficient Support of Multiple Traffic Aggregates (or Packet Sets) Per Link

In practice, instead of maintaining a single packet set, i.e. $L_{i,j}$, per link, some TMA applications may demand finer-grain definitions of packet sets, e.g. based on the protocol-type and/or port number of the packets. Another interesting use of multiple finer-grain packet sets per link is the use of "time-indexed" packet sets in which the original measurement period is divided into multiple smaller intervals so that one can estimate, admittedly with limited resolution, the path delay within a network by computing the cardinality of the intersection of the time-indexed packet sets belonging to different links within the network.

To support multiple packet sets per link, a naive approach would assign a separate TD for each of the finer-grain packet set of interest. However, by introducing a generalized packet-set-intersection technique, we can support the network-wide TMA for $O(Q^2)$ types of finer-grain traffic aggregates using only Q TD's per line-card. The basic idea of this technique is as follows:

Assume we need to support $K=2^k$ packet sets per link. Instead of assigning a TD for each of the K packet sets, denoted by $P_1, P_2, \ldots P_K$, we construct a list of Q artificial packet sets $S_1, S_2, \ldots, S_Q$ where $$\binom{Q}{2} = Q(Q-1)/2 \geq K.$$

The $S_1, S_2, \ldots S_Q$ are defined such that, ∀i, 1≦i≦K, there exists $1 \leqq q1, q2 \leqq Q$ where $P_i = S_{q1} \cap S_{q2}$. In other words, every $P_i$'s can be "recovered" from the intersection of a pair of artificial sets. Thus, by maintaining only the TD's for each of the Q artificial sets $S_1, S_2, \ldots, S_Q$, denoted by $TD_{S_1}, TD_{S_2}, \ldots, TD_{S_Q}$ respectively, we can compute the cardinality of any intersection or union set with $P_i$ as one of its component. This is by first expressing $P_i$ as $S_{q1} \cap S_{q2}$ and then applying Eq.(3) and the distinct sample counting techniques as discussed before. As an example, with this set-intersection techniques, we only need to maintain 24 TD's per link in order to simultaneously support TMA of 276 finer-grain traffic aggregates network-wide. Even with the high-resolution, 0.87 MByte TD's, the total TD memory requirement per line-card for such configuration is less than 21 MByte or 8.4% of the amount memory (2 Gbits, or 200 msec-worth of buffering) found in a typical 10 Gbps line-card today.

In theory, we can further reduce the number of required TD's to 2 $\log_2$ K per line-card by applying $\log_2$ K stages of intersections among 2 $\log_2$ K artificial sets (each corresponds to the bit-value of the $\log_2$ K bits binary representation of K) to recover each $P_i$. However, the accumulated estimation errors may be excessive due to the large number of terms on the R.H.S. of Eq.(3). This, in turn, would increase the memory requirement of each TD in order to reduce per-stage estimator error. The detail trade-offs between number of stages of intersection and the increase memory requirement per TD would be a subject of our investigation.

3. Further Estimation Error Reduction by Considering Network-Wide Flow-conservation Constraints Another way to conserve TD memory is by reducing the effective estimation errors in the $|F_{i,j}^k$'s via post-processing of the initial estimates. In this scheme, after a node receives the initial estimates of the $|F_{i,j}^k|$'s from all nodes within the network, it will perform a minimum square error (MSE) optimization based on nodal flow conservation constraints expressed in terms of the $|F_{i,j}^k|$'s. Let $\hat{f}_{i,j}^k$ be the initial estimated value of $|F_{i,j}^k|$ received. The motivation of this optimization is to try to reduce the collective errors in the initial estimates $\hat{f}_{i,j}^k$'s by reconciling their inconsistencies in view of the nodal flow conservation constraints. Let $F_{i,j}^k$ be the new estimated value of $|F_{i,j}^k|$ which would satisfy nodal flow conservation constraints. Denote by $e_{i,j}^k = f_{i,j}^k - \hat{f}_{i,j}^k$ which is the perturbation required for changing $\hat{f}_{i,j}^k$ to $f_{i,j}^k$. Consider the following MSE optimization problem:

$$\text{Minimize}\Big\{\sum_{\substack{(i,j)\in E\\ k\in V\times V}} (e_{i,j}^k)^2\Big\}$$

subject to $$\sum_{(i,j)\in E} \left(\hat{f}_{i,j}^k + e_{i,j}^k\right) = \sum_{(j,i)\in E} \left(\hat{f}_{j,i}^k + e_{j,i}^k\right) \quad \forall\, i \in V,\ \forall\, k = (s, d) \in V \times V,\ s \neq i,\ d \neq i$$

$$\sum_{(i,j)\in E} \left(\hat{f}_{i,j}^k + e_{i,j}^k\right) = |O_i| \quad \forall\, i \in V,\ \forall\, k = (i, d),\ d \in V$$

$$\sum_{(j,i)\in E} \left(\hat{f}_{j,i}^k + e_{j,i}^k\right) = |D_i| \quad \forall\, i \in V,\ \forall\, k = (s, i),\ s \in V$$

The solution to the above optimization would yield the "collectively" minimum perturbations on $\hat{f}_{i,j}^k$'s, i.e. the $e_{i,j}^k$'s, so that the new estimates $f_{i,j}^k = \hat{f}_{i,j}^k + e_{i,j}^k$ will, at least, satisfy the nodal flow conservation constraints as in the case of the true values of $|F_{i,j}^k|$'s. We conjecture that by considering the flow conservation constraints, (which must be satisfied by the true values of $|F_{i,j}^k|$'s), we will bring our estimates closer to the their true values.

4. Inter-Node Communication Bandwidth Optimization

The dominant controlling factors on communication bandwidth requirement of the present invention DATALITE include:

(1) The number and size of the TD's to be exchanged, (2) The frequency of the exchange of the TD's and the resultant traffic flow estimators and (3) The way through which the TD's and the traffic flow estimators are distributed throughout the network.

We have already described previously how (1) can be controlled and reduced. Here, we will note a few additional optimization opportunities regarding (1). First, depending on the need of the TMA application, i.e. the traffic measurements of interest, we may only need to distribute a selected set of TD's to other nodes in the network. For example, while Sample TMA Task#1 requires the full-mesh exchange of $TD_{O_i}$ and $TD_{D_i}$ among all nodes within the network, Sample Task#2 only requires the distribution of the $TD_{D_i}$ of the downstream DDoS attack victim node. We can also compress the TD's at the end of a measurement period before distributing them to other relevant nodes.

The dual periodic broadcast and on-demand query-and-answer modes of operations supported by DATALITE also help to control (2). In fact, the frequency of exchange of the TD's and resultant traffic flow estimators is largely dictated by the need of the application. For example, for change-detection type of applications, e.g. the detection of route mis-configuration/network failure, the exchange-frequency should be much higher in order to reduce detection time. Fortunately, these are also the applications where lower-precision measurements/estimates, i.e. smaller TD's, may be sufficient because the resultant changes on flow patterns and per-link flow values caused by the event of interest tend to be significant. On the other hand, the TMA applications which require higher precision measurements/estimates (and thus larger TD's) tend to be meaningful only over a longer measurement interval, which in turn, helps to reduce the bandwidth requirement. Another advantage of the DATALITE scheme is that the TD memory requirement grows very slowly (O(loglog T)) with measurement period T. As stated above, we can effectively keep the size of TD constant for measurement period up to 8000 seconds long, which should be adequate for most traffic measurement applications.

Finally, the distribution pattern of the TD's should be decided based on the number and size of the TD's as well as the required distribution frequency. To put things into perspective, let's consider two extreme scenarios (or applications requirements). In the first scenario, the 1.7 KByte TD's are used in traffic-pattern-change/failure detection applications or DDoS traceback. Even if the uncompressed $TD_{o_i}$ and $TD_{D_i}$ of a each node are distributed to all other nodes every one second using flooding (the most expensive option bandwidth-wise), the total TD-traffic generated on every link in the network will not exceed 2*1.7*8* |V| Kbps, i.e. 2.72 Mbps per link for a 100-node network, or less than 0.03% of the capacity of a 10 Gbps link. In the second scenario, special hourly traffic study is conducted to measure network-wide time-of-the-day statistics and route behavior of fine-grain traffic types. Here, 24*2 higher-resolution, uncompressed TD's of 0.87 MByte each are distributed, every hour, using a full I-BGP mesh between all nodes within the same network to analyze the behavior of 276 types of traffic aggregates network wide (using generalized set-intersection technique described above). The corresponding incoming TD's bandwidth per-node is 0.87*8*2*24*100/3600 Mbps=9.28 Mbps which is still less than 0.1% of the capacity of a 10 Gbps link.

CONCLUSION

In summary, by taking a direct-measurement approach, the present invention DATALITE avoids the problems caused by invalid traffic modeling or operational assumptions which plague the network tomography approaches. Although there are some high-level commonalities between the present invention DATALITE scheme and the existing trajectory-based ones, there are key differences between them: First, by formulating the traffic measurement problem as a series of set-cardinality-determination problems, we can leverage recent advances in distinct sample counting to perform traffic analysis in a distributed manner with minimal communications overhead. Second, by focusing on the measurements and analysis of traffic aggregate behavior instead of individual packet ones, the system memory and communication bandwidth requirements for the DATALITE invention are much reduced relative to previous methods. As a result, it is possible for DATALITE to adopt a distributed computational model as opposed to the heavy-weight, centralized approach taken by existing trajectory-based systems.

The foregoing description merely illustrates the principles of the invention. It will thus be appreciated that those skilled in the art will be able to devise various arrangements, which, although not explicitly described or shown herein, embody the principles of the invention, and are included within its spirit and scope. Furthermore, all examples and conditional language recited are principally intended expressly to be only for instructive purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Many other modifications and applications of the principles of the invention will be apparent to those skilled in the art and are contemplated by the teachings herein. Accordingly, the scope of the invention is limited only by the claims appended hereto.

What is claimed is:

1. A method of performing analysis of traffic within a packet communications network, said method comprising:

extracting a plurality of aggregation based traffic digests from selected nodes within said network based on a given packet-set membership determination;

distributing relevant local traffic digests to one or more of said selected nodes within said network;

receiving relevant remote traffic digests from one or more of said selected nodes within said network;

generating and providing to one or more of the selected nodes a local traffic-flow estimation based on said local traffic digests and said remote traffic digests;

receiving from one or more of the selected nodes remote traffic-flow estimations;

formulating and solving a set cardinality determination problem for a given parameter in said network based on said local and remote traffic-flow estimations; and outputting the solution of the set cardinality determination problem as a measurement of traffic within said network.

2. The method of claim 1, wherein said aggregation based traffic digests are O(loglog N) sized traffic digests.

3. The method of claim 1, wherein said set cardinality problem is a series of union set cardinality determinations.

4. The method of claim 1, wherein a specified traffic flow is for a selected link in said network.

5. The method of claim 1, wherein said step of extracting traffic digests includes the steps of:

extracting a packet identifier from each packet belonging to a specified packet set;

inputting each packet identifier to a hash function to receive a $R_{max}$-bit hash output, $\log_2 m$ bits of said $R_{max}$-bit hash output being used to determine a bucket index;

splitting said hash output into m buckets based on said bucket index;

for each bucket i of said m buckets track $R_i$, the maximum number of consecutive leading zeros in the first ($R_{max}$−$\log_2 m$) bits of all hash outputs assigned to the ith bucket by using r( );

utilizing $R_1$ through $R_m$ as the traffic digest for said specified packet set.

6. The method of claim 5, wherein once a last $\log_2 m$ bit is used for said bucket index, a remaining ($R_{max}$-$\log_2 m$) bits of each hash output is used for counting a maximum number of consecutive leading zeros in order to determine r( ) to yield $R_i$.

7. The method of claim 1, further including applying one or more O(loglog |N|) distinct sample counting algorithms to solve said union set cardinality determination in a distributed manner.

8. The method of claim 7, wherein an essentially O(loglog $N_{max}$)-bit digest is used to summarize necessary information in a packet set $L_{i,j}$, where $N_{max}$ is a maximal number of distinct samples in $L_{i,j}$.

9. The method of claim 1, wherein a packet counter $C_{i,j}$ for every link (i, j)∈E is maintained to track a count of packets passing through a link during a same measurement period as a traffic digest measurement period, wherein a large discrepancy between the values of $C_{i,j}$ and $|L_{i,j}|$ indicate a potential routing problem.

10. The method of claim 1, further including using "time-indexed" packet sets in which an original measurement period is divided into multiple smaller intervals to estimate a path delay within a network by computing the cardinality of the intersection of the time-indexed packet sets belonging to different links within the network through the use of Q artificial sets.

11. The method of claim 10, wherein said Q artificial sets are used to monitor K packet sets of interest, where Q*(Q−1)/2>=K, and thus Q<<K.

12. The method of claim 1, further including reducing effective estimation errors in $|F_{i,j}^k|$'s via post-processing of the initial estimates, wherein after a node receives initial estimates of the $|F_{i,j}^k|$'s from all nodes within the network, it will perform a minimum square error (MSE) optimization.

13. The method of claim 1, wherein depending on a traffic analysis application, distributing a selected set of TD's to other nodes in the network.

14. The method of claim 1, wherein traffic digests are compressed at the end of a measurement period before distributing them to other relevant nodes.

15. The method of claim 1, wherein said analysis of traffic is selected from the group consisting of analysis of traffic route patterns, analysis of traffic flow patterns and tracing an origination, destination as well as intermediate nodes and links traversed by a given group of packet of interest.

16. A method of performing analysis of traffic within a packet communications network, said method comprising:

extracting a plurality of aggregation based traffic digests from selected nodes within said network based on a given packet-set membership determination;

receiving relevant local traffic digests from one or more of said selected nodes within said network;

distributing relevant remote traffic digests to one or more of said selected nodes within said network;

receiving from one or more of the selected nodes a local traffic-flow estimation based on said local traffic digests and said remote traffic digests;

distributing to one or more of the selected nodes remote traffic-flow estimations;

formulating and solving a set cardinality determination problem for a given parameter in said network based on said local and remote traffic-flow estimations; and outputting the solution of the set cardinality determination problem as a measurement of traffic within said network.

17. The method of claim 16, wherein said analysis of traffic is selected from the group consisting of traffic route patterns, analysis of traffic flow patterns and tracing an origination, destination as well as intermediate nodes and links traversed by a given group of packet of interest.

18. The method of claim 16, wherein an essentially O(loglog $N_{max}$)-bit digest is used to summarize necessary information in a packet set $L_{i,j}$, where $N_{max}$ is a maximal number of distinct samples in $L_{i,j}$.

* * * * *